United States Patent [19]

Olson

[11] Patent Number: 4,514,652
[45] Date of Patent: Apr. 30, 1985

[54] LIQUID COOLED HIGH SPEED SYNCHRONOUS MACHINE

[75] Inventor: Raymond N. Olson, Rockford, Ill.

[73] Assignee: Sundstrand Corporation, Rockford, Ill.

[21] Appl. No.: 513,333

[22] Filed: Jul. 13, 1983

[51] Int. Cl.³ .............................................. H02K 9/00
[52] U.S. Cl. ...................................... 310/54; 310/86; 310/90; 310/113; 310/165
[58] Field of Search ............... 310/86, 165, 162, 113, 310/89, 90, 52, 53, 54, 55, 56, 57, 58, 59, 60 R, 60 A, 61, 64, 65, 156, 67 R, 154

[56] References Cited

U.S. PATENT DOCUMENTS

| | | | |
|---|---|---|---|
| 2,422,824 | 6/1947 | Clauson | 310/52 |
| 3,049,633 | 8/1962 | Cain | 310/54 |
| 3,078,409 | 2/1963 | Bertsche, Jr. et al. | 310/52 UX |
| 3,260,872 | 7/1966 | Potter | 310/61 |
| 3,440,461 | 4/1969 | Potter | 310/54 |
| 3,471,726 | 10/1969 | Burnier et al. | 310/54 |
| 3,480,810 | 11/1969 | Potter | 310/54 |
| 3,562,564 | 2/1971 | Potter | 310/54 |
| 3,609,420 | 9/1971 | Inagaki et al. | 310/54 |
| 3,629,627 | 12/1971 | Dafler et al. | 310/54 |
| 3,629,634 | 12/1971 | Dafler et al. | 310/54 |
| 3,648,085 | 3/1972 | Fujii | 310/54 |
| 3,659,125 | 4/1972 | Basel | 310/54 |
| 3,675,057 | 7/1972 | Pleuger | 310/86 |
| 3,727,085 | 4/1973 | Goetz et al. | 310/54 |
| 3,733,503 | 5/1973 | Potter | 310/54 |
| 3,831,046 | 8/1974 | Curtis et al. | 310/54 |
| 3,896,320 | 7/1975 | Moffatt | 310/64 |
| 4,017,755 | 4/1977 | Litz | 310/52 |
| 4,035,679 | 7/1977 | Schmohe | 310/61 |
| 4,119,872 | 10/1978 | Hunt | 310/61 |
| 4,139,789 | 2/1979 | Hunt | 310/61 |
| 4,161,668 | 7/1979 | Schmohe et al. | 310/58 |
| 4,203,044 | 5/1980 | Linscott, Jr. | 310/61 |
| 4,221,982 | 9/1980 | Raver et al. | 310/59 |
| 4,241,269 | 12/1980 | Antonov et al. | 310/61 |
| 4,262,224 | 4/1981 | Kofink et al. | 310/54 |
| 4,289,984 | 9/1981 | Aroshidze et al. | 310/54 |

Primary Examiner—R. Skudy
Attorney, Agent, or Firm—Wood, Dalton, Phillips, Mason & Rowe

[57] ABSTRACT

A rotary electric machine such as a brushless generator including a housing, a stator within the housing and a rotor journalled within the housing. A stationary element is affixed to the housing and extends axially into a cavity in the rotor and a barrier is provided in the air gap between the stator and the rotor. The barrier serves to isolate the flow of coolant to the stator from the air gap and the stationary element serves as a means for mounting, within the rotor, components of a permanent magnet generator and an exciter which may be wholly contained within the rotor. The stationary element is also provided with a conduit for conducting coolant to the various components of the rotor.

10 Claims, 5 Drawing Figures

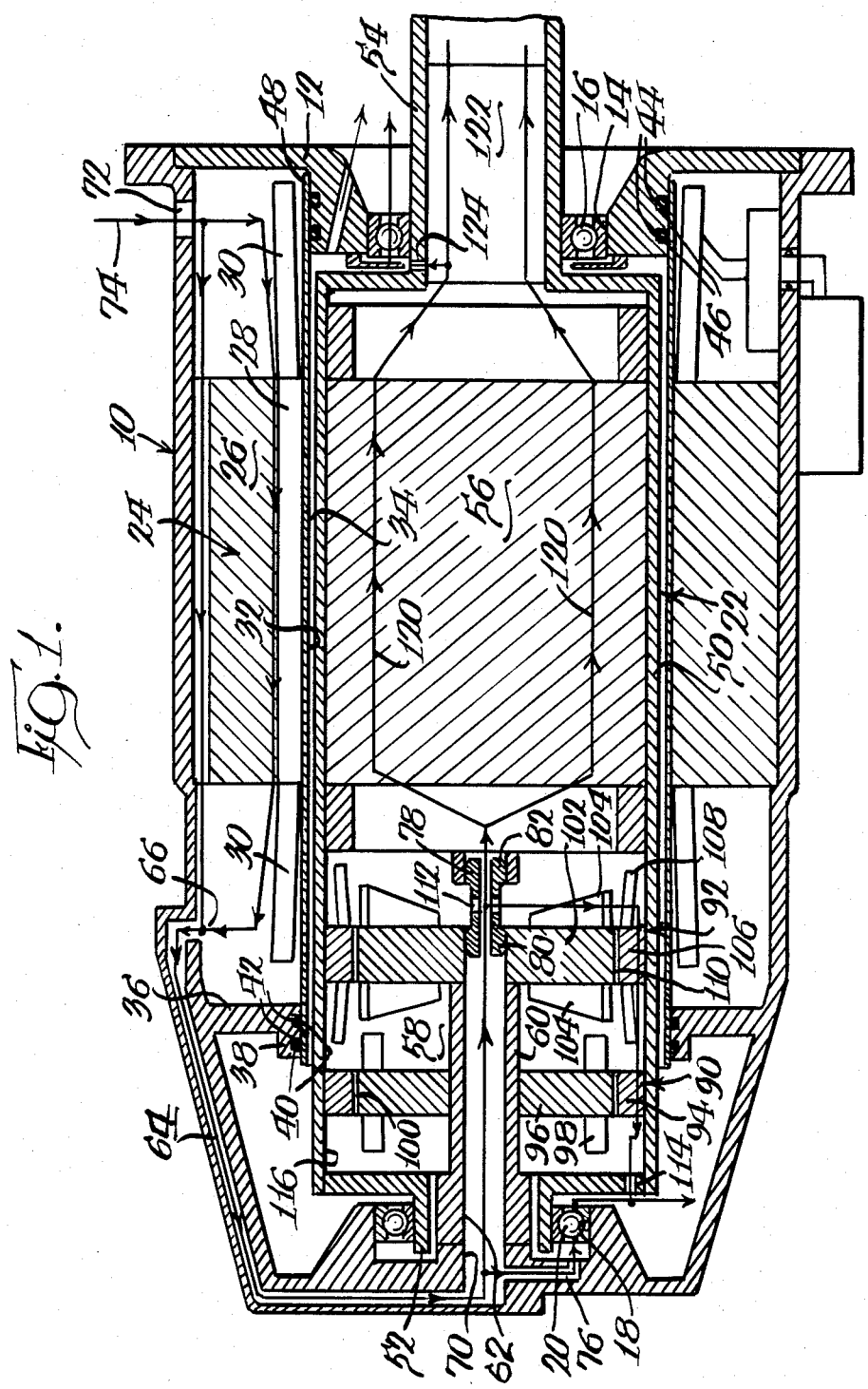

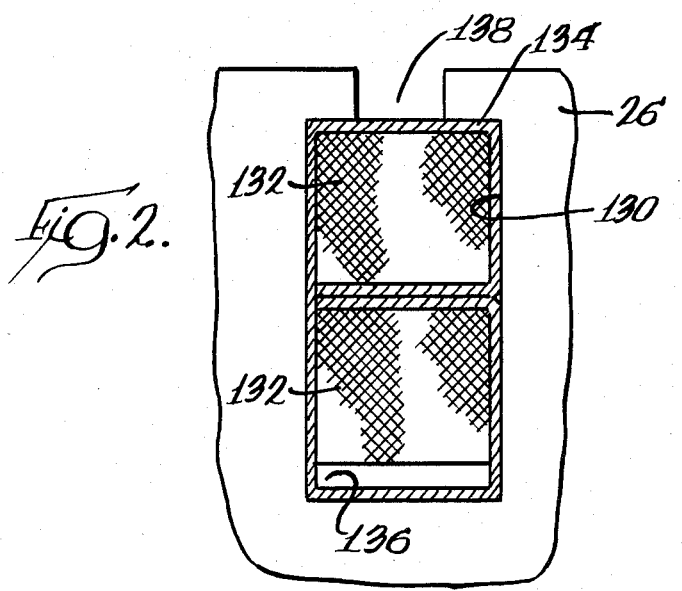
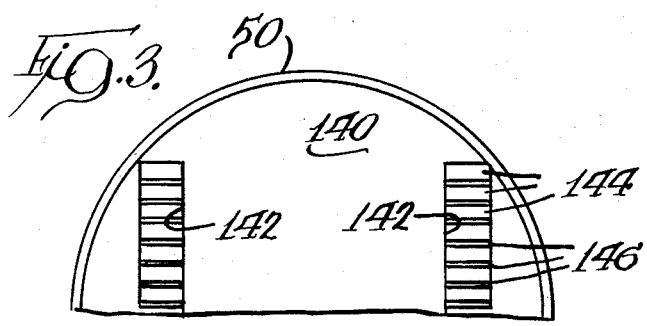
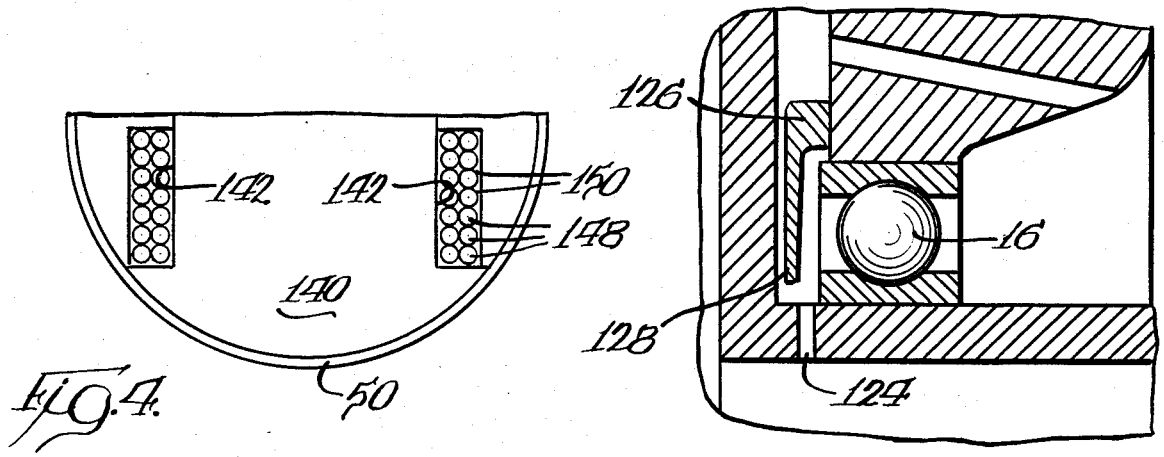

LIQUID COOLED HIGH SPEED SYNCHRONOUS MACHINE

DESCRIPTION

1. Technical Field

This invention relates to liquid cooled high speed synchronous machines, and more particularly, to rotary electric machines such as brushless generators.

2. Background Art

Prior art of possible relevance includes the following U.S. Pat. Nos.: 3,609,420 issued Sept. 28, 1971 to Inagaki et al; 3,629,627 and 3,629,634 both issued Dec. 21, 1971 to Dafler et al; 3,727,085 issued Apr. 10, 1973 to Goetz et al; and 4,139,789 issued Feb. 13, 1979 to Hunt.

High speed, high power rotary electric machines have long employed liquid cooling of electrical components to increase efficiency. Various methods have been employed and generally fall into two categories. One category is that of a confined cooling system while the other category is that of a non-confined cooling system.

Confined cooling systems typically employ fins, ducts, tubes and the likes for conducting the coolant through the apparatus. This approach, while providing cooling, has the disadvantage of not permitting direct contact between the coolant and the sources of heat with the consequence of less efficient heat transfer than might be desired. Furthermore, the structure employed necessarily results in a complex mechanical arrangement.

Non-confined cooling systems have enhanced heat transfer in that they permit direct contact of the cooling medium with the source of heat. However, they have typically suffered the disadvantage of a high drag loss resulting from the cooling medium entering the air gap between moving parts of the machine. Additionally, there may be insulation deterioration on windings as a result of the impingement of cooling oil at high velocity on such windings.

The present invention is intended to overcome the difficulties heretofore found in non-confined cooling systems of the sort mentioned above.

SUMMARY OF THE INVENTION

The principal object of the invention is to provide a new and improved rotary electric machine.

An exemplary embodiment of the invention achieves the foregoing object in a rotary electric machine including a housing, a stator within the housing and including an armature provided with windings and a rotary receiving opening and a rotor journalled within the housing and located within the opening and peripherally spaced from the armature by a first air gap. The rotor carries windings and has an interior cavity. A stationary element is affixed to the housing and extends axially into the cavity. Rotor winding energizing means including at least one winding and associated armature are carried by the rotor within the cavity and radially outwardly of the stationary element. Cooperating magnet means are mounted on the stationary element within the cavity for generating electrical current for the rotor winding. The rotor winding energizing armature and the magnet means are separated by a second air gap and first coolant passages in heat exchange relation to the stator windings are provided as are second coolant passages in heat exchange relation to the rotor windings. Barrier means are disposed in the first air gap adjacent the stator for providing fluid flow isolation between the stator and the air gap and means are included for providing a liquid coolant to (a) the stator and the first passages and (b) the rotor cavity and the second passages as well as the rotor winding energizing means. Finally, means are located on the rotor for preventing coolant from entering the second air gap during operation of the machine.

In one embodiment of the invention, the preventing means comprises at least one coolant vent in the rotor davity and located radially inwardly of the cavity periphery and radially outwardly of the second air gap.

In a preferred embodiment, the providing means includes an inlet to the housing adjacent one side of the stator and separated from the first air gap by the barrier means along with a conduit in the housing opening to the side of the stator opposite the previously mentioned side as well as to the rotor cavity.

In a highly preferred embodiment, there is a conduit in the stationary element and a transfer tube rotatable with the rotor interconnects the rotor and the conduit. Spray means are disposed in the transfer tube for directing coolant at the rotor winding energizing winding and associated armature.

Typically, the rotor is journalled in the housing by bearings at opposite ends of the rotor. In preferred embodiment, one of the conduits includes at least one opening adjacent the bearings so that coolant in the conduit may exit the same to lubricate the bearings.

Other objects and advantages of the invention will become apparent from the following specification taken in connection with the accompanying drawings.

BRIEF DESCRIPTION OF THE DRAWINGS

FIG. 1 is a sectional view of a rotary electric machine, specifically a brushless generator, made according to the invention;

FIG. 2 is an enlarged fragmentary sectional view illustrating one means of providing coolant to stator windings;

FIG. 3 is an enlarged fragmentary view illustrating one means of providing lubricant to windings carried by the rotor;

FIG. 4 is a view similar to FIG. 3 showing an alternative means of providing coolant to rotor windings; and FIG. 5 is an enlarged view illustrating a means whereby coolant may be employed to lubricate bearings and yet be prevented from entering an air gap.

BEST MODE FOR CARRYING OUT THE INVENTION

An exemplary embodiment of a rotary electric machine made according to the invention in the form of a brushless generator is illustrated in the drawings and with reference to FIG. 1 is seen to include a housing, generally designated 10. The housing 10, at one end, includes an end cap 12 provided with a central opening 14 in which bearings 16 are disposed.

At the opposite end of the housing 10, the same includes an internal recess 18 for receipt of bearings 20. A rotor, generally designated 22, has its opposite ends journalled in the bearings 16 and 20 within the housing 10.

Within the housing 10 is a stator, generally designated 24 including an armature 26 provided with windings 28 having end turns 30 extending from opposite sides of the armature 26. The armature 26 also includes a central opening 32 through which the rotor 22 extends but is spaced therefrom by a small peripheral air gap 34.

Within the housing 10 oppositely of the end cap 12 is a radially inwardly directed web 36 having its radially inner end 38 provided with radially inwardly opening grooves 40. O-ring seals 42 are disposed within the grooves 40.

The end cap 12 includes radially outwardly opening grooves 44 receiving similar O-rings 46. A cylindrical, liquid impervious barrier 48 is fitted within the opening 32 in the armature 26 so as to abut the latter and thereby be spaced from the periphery of the rotor 22. The barrier 48 has sufficient axial length so as to have its opposite ends sealingly engaged by the seals 42 and the seals 46. As will be seen, the barrier 48 serves to isolate the air gap 34 from liquid coolant. In order to avoid disruption of the magnetic field of the machine, the barrier 48 is made of non-magnetic material.

The rotor 22 includes a generally cylindrical can 50 defining its outer periphery. At one end, the can 50 has a reduced diameter section 52 journalled in the bearings 20. An opposite reduced diameter section 54 is journalled in the bearing 16 and is adapted to be driven by any suitable source of motive power (not shown).

Within the can 50, the rotor 22 includes main rotor magnetics in the area shown at 56 aligned with the armature 26 of the stator 24. To one side thereof, the rotor 50 includes an interior cavity 58.

Coaxial with the axis of rotation of the rotor 22 and within the housing 10 is a stationary element 60 which extends into the cavity 58. The element 60 has a hollow interior 62 defining a conduit. The element 60 may be secured to the interior of the housing 10 by any suitable means and the housing 10 itself includes a conduit 64 opening as at 66 on one end to the left-hand side of the stator 24 as viewed in FIG. 1. At its opposite end, the conduit 64 opens as at 70 to the conduit 62 in the stationary element 60.

On the side of the stator 24 opposite from the opening 66, the housing 10 is provided with an inlet 72 through which coolant which preferably is a combination lubricant and coolant may be introduced. The coolant follows the path indicated by an arrow 74 through passages to be described in the armature 26 to enter the conduit 64 and ultimately be directed to the interior of the stationary element 60. This coolant is prevented from entering the air gap 34 by the barrier 48.

The conduit 64 includes a branch or opening 76 within the housing 10 extending to the bearings 20. Consequently, certain of the coolant introduced into the housing 10 via the inlet 72 may be supplied to the bearings 20 for lubricating purposes after it has cooled the stator 24.

A transfer tube 78, which may be of conventional construction, has one end 80 disposed within the conduit 62 in the stationary element 60 and its opposite end 82 in fluid communication with passages to be described in the main rotor magnetics 56. The transfer tube 78 is preferably, though not necessarily, rotatable with the rotor and is operable to conduct coolant in the conduit 62 to the previously alluded to passages for cooling of the main portion of the rotor.

Within the cavity 58, there is located a permanent magnet generator, generally designated 90 and an exciter, generally designated 92. The permanent magnet generator 90 includes a series of permanent magnets 94 mounted on the interior of the can 50 and thus forming the rotor of the permanent magnet generator 90. A stator 96 having windings 98 for the permanent magnet generator 90 is located in the cavity 58 in axial alignment with the permanent magnets 94 and is secured to the stationary element 60 by any suitable means. The stator 96 is separated from the magnets 94 by a small air gap 100.

The exciter 92 includes a stator 102 having windings 104 secured to the stationary element 60 within the cavity 58. Additionally, the exciter 92 includes a rotor 106 radially outwardly of the stator 102 and carried by the interior of the rotor can 50. The rotor 106 of the exciter 92 likewise has windings as are shown at 108. The exciter stator 102 and exciter rotor 106 are radially separated by a small air gap 110.

As is well known, the permanent magnet generator 90 provides sufficient induced current to create a magnetic field in the exciter 92. This in turn causes generation of current in the exciter rotor windings 108, usually as alternating current, which is then rectified by means not shown to energize the main rotor windings which in turn causes the induction of current within the stator windings 30 which is employed as is desired.

The transfer tube 78 includes generally radially directed bores 112 which serves as spray means or nozzles allowing coolant to exit generally radially within the rotor 22. It will be observed that the bores 112 are axially spaced from the air gaps 100 and 110 and aligned with portions of the windings 104 and 108. Consequently, the radially flowing coolant impinges upon such windings to provide cooling action. During rotation of the rotor 22, centrifugal force will cause the coolant to closely conform to the interior of the cavity 58 once it has exited the bores 112 and thus, the same will come in contact with the permanent magnet generator rotor 94 and the exciter rotor 106.

At the left-hand side, the rotor 22 includes one or more vents 114 which are located radially outwardly of the air gaps 100 and 110 but radially inwardly of the periphery 116 of the cavity 58. Consequently, during operation of the device, there will be a hollow cylindrical body of coolant within the cavity 58 closely conforming to the periphery 116 of the cavity 58. As additional coolant eminates from the bores 112, the radially inner surface of such body of coolant will move radially inwardly until such time as it reaches the location of the vent or vents 114. The same may then exit the interior cavity 58 of the rotor 22 and flow into a collection space 116 within the housing 10. From the collection space 116, the coolant may be recirculated back to the inlet 72 by any suitable and conventional means.

As can be seen, the location of the vent 114 thus assures the presence of a sufficient body of coolant to provide cooling action for the permanent magnetic generator 90 and the exciter 92 and yet prevents, during operation of the machine, the entry of such coolant into the air gaps 100 and 110.

Coolant exiting the end 82 of the transfer tube 78 flows through passages in the main portion 58 of the rotor 22 as generally alluded previously as illustrated by arrows 120. At the reduced diameter section 54, the streams of coolant converge and exit the rotor via the hollow center 122 of the reduced diameter section 54. Prior to that occurring, some of the coolant will enter radially directed bores 124 in the reduced diameter section 54 which are closely adjacent the bearings 16. The coolant emanating from such bores 124 is caused to lubricate the bearings 16 by the presence of an annular baffle 126 having a radially inwardly directed flange 128 axially spaced to one side of the bores 124 sufficiently so as to intercept all oil or coolant emanating therefrom before the same can travel radially outwardly to the air gap 32 as best seen in FIG. 5.

Turning now to FIG. 2, one means of providing oil or coolant flow paths through the armature 26 is illustrated. As is well known, the armature 26 is provided with slots 130 receiving stator windings 132. Suitable insulation 134 surrounds the windings 132 and the lowermost winding 132 is spaced from the bottom of the slot 130 so as to define a channel 136 through which coolant may travel. The channels 136 open from the armature 26 at its opposite ends.

Coolant may also flow through the open upper ends 138 of the slots 130. Thus, direct contact of the coolant with the windings is assured to enhance cooling capacity.

In the case of the rotor, two methods of providing passages therethrough are illustrated in FIGS. 3 and 4. In the case of the machine shown, the rotor is a two pole type and is provided with a series of laminations 140 having radially openings slots 142 spaced from each other by 180°. As shown in FIG. 3, the windings of the rotor may be formed of rectangular copper 144 as is well known. The rectangular copper pieces 144 are spaced from each other by gaps 146 which serve as cooling channels for the passage of the coolant axially along the length of the rotor.

Alternatively, and as shown in FIG. 4, where the windings are formed of circular cross section conductors 148, typically of copper, it will be appreciated that the naturally occurring voids such as seen at 150 between the conductors form longitudinal coolant passages for the flow of the coolant. Again, direct contact of the coolant with the conductors is provided to maximize cooling efficiency.

From the foregoing, it will be appreciated that a rotary electric machine made according to the invention avoids inefficiencies due to drag loss resulting from the entry of coolant into air gaps by the use of the barrier 48 and the unique location of the vent 114. At the same time, it will be appreciated that maximum heat transfer is provided by reason of direct contact between the coolant and windings. High velocity liquid impingement on components is virtually totally avoided to minimize insulation deterioration resulting from that action. Consequently, the advantages of a non-confined cooling system over confined cooling systems are retained while the disadvantages are avoided.

I claim:

1. In a rotary electric machine, the combination of:
   a housing;
   a stator within said housing and including an armature provided with windings and a rotor receiving opening;
   a rotor journalled within said housing and located within said opening and peripherally spaced from said armature by a first air gap, said rotor carrying windings and having an interior cavity;
   a stationary element affixed to said housing and extending axially into said cavity;
   rotor windings energizing means including at least one winding and associated armature carried by said rotor within said cavity and radially outwardly of said stationary element and cooperating magnet means mounted on said stationary element within said cavity for generating electrical current for said rotor windings, said rotor windings energizing armature and said magnet means being separated by a second air gap;
   first coolant passages in heat exchange relation to said stator windings;
   second coolant passages in heat exchange relation to said rotor windings;
   barrier means in said first air gap adjacent said stator for providing fluid flow isolation between said stator and said first air gap;
   means for providing a liquid coolant to (a) said stator including said first passages, (b) to said rotor cavity including said second passages and said rotor winding energizing means; and
   means on said rotor for preventing coolant from entering said second air gap during operation of said machine.

2. The rotary electric machine of claim 1 wherein said preventing means comprises at least one coolant vent in said rotor for said cavity located radially inwardly of the cavity periphery and radially outwardly of said second air gap.

3. The rotary electric machine of claim 1 wherein said providing means includes a conduit in said stationary element.

4. The rotary electric machine of claim 1 wherein said providing means includes an inlet to said housing adjacent one side of said stator and separated from said first air gap by said barrier means and a conduit in said housing opening to the side of said stator opposite said one side and to said rotor cavity.

5. The rotary electric machine of claim 1 wherein said providing mans includes a conduit in said stationary element, a transfer tube interconnecting said rotor and said conduit, and spray means in said transfer tube for directing coolant at said rotor winding energizing winding and associated armature.

6. In a rotary electric machine, the combination of:
   a housing;
   a stator within said housing and including an armature provided with windings and a rotor receiving opening;
   a rotor journalled within said housing and located within said opening and peripherally space from said armature by a first air gap, said rotor carrying windings and having an interior cavity;
   a stationary element affixed to said housing and defining a conduit extending axially into said cavity;
   rotor windings energizing means including at least one winding and associated armature carried by said rotor within said cavity and radially outwardly of said stationary element and cooperating magnet means mounted on said stationary element within said cavity for generating electrical current for said rotor windings, said rotor windings energizing armature and said magnet means being separated by a second air gap;
   barrier means in said first air gap adjacent said stator for providing fluid flow isolation between said stator and said air gap; and
   means for providing a liquid coolant to said rotor winding energizing means including said conduit and a transfer tube interconnecting said rotor and said conduit and having generally radially directed passages opening toward said rotor winding energizing means.

7. The rotary electric machine of claim 6 wherein said passages direct coolant generally radially at a location axially spaced from said second air gap, and means for preventing coolant from entering said second air gap during machine operation including a coolant vent for said cavity located radially outwardly of said second air gap.

8. The rotary electric machine of claim 7 wherein said vent is additionally located radially inwardly of the periphery of said cavity.

9. In a rotary electric machine, the combination of:
a housing;
a stator within said housing and including an armature provided with windings and a rotor receiving opening;
a rotor journalled within said housing and located within said opening and peripherally spaced from said armature by a first air gap, said rotor carrying windings and having an interior cavity;
a stationary element affixed to said housing and having a conduit extending axially into said cavity;
rotor windings energizing means including at least one winding and associated armature carried by said rotor within said cavity and radially outwardly of said stationary element and cooperating magnet means mounted on said stationary element within said cavity for generating electrical current for said rotor windings, said rotor windings energizing armature and said magnet means being separated by a second air gap;
first coolant passages in heat exchange relation to said stator windings;
second coolant passages in heat exchange relation to said rotor windings;
barrier means in said first air gap adjacent said stator for providing fluid flow isolation between said stator and said air gap; and
means for providing a liquid coolant to (a) said stator including said first passages, (b) to said rotor cavity including said second passages and said rotor winding energizing means including an inlet to said housing adjacent one side of said stator and separated from said first air gap by said barrier means, a conduit in said housing opening on one end to the side of said stator opposite said one side and being in fluid communication with said stationary element conduit, and a transfer tube interconnecting said stationary element conduit and said rotor.

10. The rotary electric machine of claim 9 wherein said rotor is journalled in said housing by bearings at opposite ends of said rotor, and one of said conduits includes at least one opening adjacent said bearings whereby coolant in said one conduit will exit the same to lubricate said bearings.

* * * * *